April 27, 1937. G. VAN DUSEN Re. 20,344

TYPE CARD FOR PRINTING MACHINES

Original Filed Sept. 1, 1930

INVENTOR.
George Van Dusen, deceased
By Gaylord Brothers, Incorporated
By Henry J. Gaylord
president
BY Robb & Robb
Attorneys Reissued Apr. 27, 1937 Re. 20,344

UNITED STATES PATENT OFFICE 20,344

TYPE CARD FOR PRINTING MACHINES

George Van Dusen, deceased, late of Syracuse, N. Y., by Gaylord Brothers, Incorporated, Syracuse, N. Y., assignee Original No. 1,818,830, dated August 11, 1931, Serial No. 479,122, September 1, 1930. Application for reissue January 25, 1937, Serial No. 122,314

8 Claims. (Cl. 101—369)

This invention relates to a type-card of the class set forth in the pending application of L. W. Moulton, Serial No. 394,530, filed September 23, 1929, now Patent No. 1,830,555 and is adapted to be used in printing machines similar to those set forth in the pending applications of L. W. Moulton, Serial No. 394,531, filed September 23, 1929, now Patent No. 1,881,090 and Serial No. 511,816, filed January 28, 1931, now Patent No. 1,986,352 for receiving and making impressions or records used in public circulating libraries and other places where books and other articles are loaned to patrons for limited periods of time.

In this particular instance at least two cards are used for each patron, one of said cards, commonly known as the identification card, being provided with negative identification type adapted to be impressed upon the other card, which in turn, known as the librarian or record card, is adapted not only to receive impressions of the dates of loan and return of the borrowed articles but also the impressions from the type of the identification card opposite the dates of loan and return.

These two cards are placed in the printing machine in such manner and in such relation that the identification impressions will be made simultaneously with and in opposed relation to the date impressions upon the librarian's record card.

That is, the record card for each borrower, with the identification number printed thereon, is retained by the librarian while the other card bearing the type-plate with the identification number thereon, is retained by the borrower so that when the borrower wishes to obtain or return any article from the library, the librarian places both cards in the printing machine which automatically prints the date of the loan or return upon the record card and simultaneously makes an impression upon the same record card of the identification number of the borrower opposite the date of loan or return, both cards then being removed from the printing machine, one for the files of the library and the other to be given to the borrower.

Under this system provision is made for changing the date type in the printing machine from day to day, month to month and year to year, but the identification card with the same type plate thereon may be used for indefinite periods of time, according to the frequency of borrowing and returning articles from and to the library.

The type plates are usually made of metal while the remaining portion of the identification card is preferably made of tough paper or equivalent material and of about the same size as the record card with sufficient space thereon to receive other records if desired, and it is therefore evident that the metal type plate will outwear the remaining portions of the identification card to such an extent as to require more or less frequent replacements of the type plate with other cards.

The present invention is directed more particularly to the identification card bearing the metal type-plate and to the means for attaching the type-plate to the card in such manner that it will lie closely adjacent to the plane of the card so that the latter may be readily inserted into and removed from the printing machine.

The main object of the present invention, therefore, is to construct the type-plate and its card in such manner that the former may be easily and quickly removed and replaced with another card without mutilating the latter and at the same time to automatically hold the type-plate and card against accidental displacement, one from the other.

One of the specific objects is to provide the type-card with suitable guides along which latter the type-plate may be adjusted by sliding movement to and from an operative printing position, so that when the type-card is placed in the printing machine its type may be impressed upon the other card by the action of the relatively movable platens of the printing machine.

Other objects and uses relating to the specific parts of the invention will be brought out in the following description.

In the drawing:—

Figure 1:
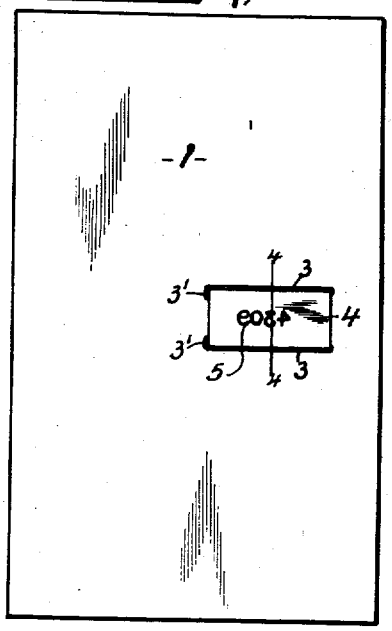
Figure 1 is a face view of a type-card with the type-plate in operative position thereon, as observed from the side which makes the printing impressions on the other record card (not shown).
Figure 2:
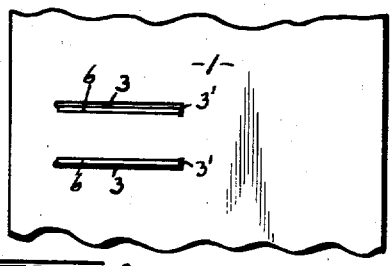
Figure 2 is an opposite face view of the same card showing the guide slots therein, with the plate in operative position.
Figure 3:
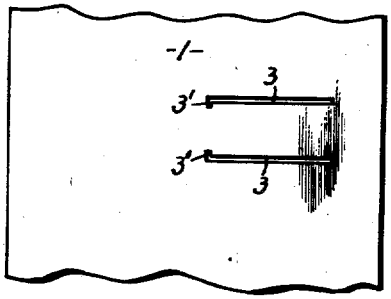
Figure 3 is a face view of a portion of the same card as shown in Figure 1, with the type-plate removed.

As illustrated, this invention comprises a rectangular card 1 of comparatively thin tough paper or equivalent material having spaced guide slots 3 therein.

The guide slots 3 are relatively narrow and are preferably arranged toward one edge of the card and some distance in from the margin.

The slots 3 are provided at one end with lateral branches 3′ extending toward each other for receiving portions of a type-plate 4.

This type-plate preferably consists of a rectangular piece of relatively thin type metal or equivalent material of about the same length as the length of the slots 3 and of approximately the width corresponding to the distance between the slots.

The central portion of the main body of the plate 4 is provided with negative type 5 embossed therein to face in one direction.

The opposite longitudinal edges of the plate 4 are offset in the same direction and returned toward each other to form flanges 6 and intervening grooves 7.

The transverse widths of the offset slots 3′ correspond approximately to the transverse widths of the flanges 6 on the plate 4 to enable the ends of the flanges to enter the offset slots 3′ and thus permit the entire type-plate to be moved endwise along the guide slots 3 with the main body of the plate closely contiguous one face of the card 1 while the flanges 6 overlap upon the other face of the card for holding the plate and card against relative transverse movement.

That is, when assembling the plate upon a card it may be tilted at an angle to the plane of the card and one end of the flanges 6 inserted through the branch slots 3′, whereupon the entire plate may be moved along the guide slots 3 until the ends of the flanges abut against the corresponding ends of said slots.

Figure 6:
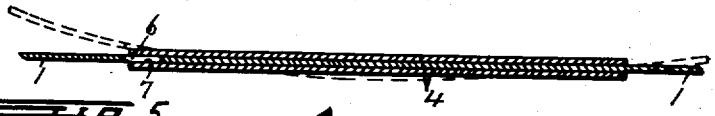
Figure 6 is an enlarged transverse sectional view taken in the plane of line 6—6, Figure 5.
Figure 4:
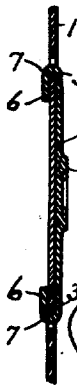
Figure 4 is an enlarged sectional view taken in the plane of line 4—4, Figure 1.
Figure 5:
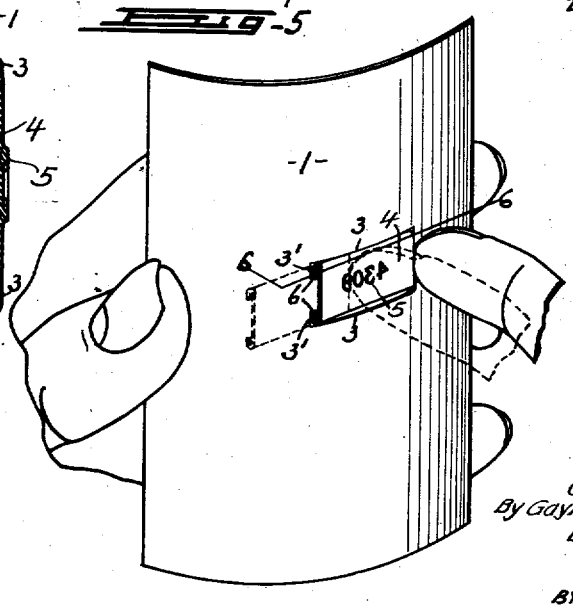
Figure 5 is a perspective view of the card shown in Figure 1, except that it is slightly bent transversely to illustrate the mode of inserting and removing the type-plate into and from its guides in the card.

Or, as shown in Figures 5 and 6, the card may be slightly bent to cause the inner walls of the branch slots 3′ to be sprung outwardly, whereupon the ends of the flanges 6 may be inserted through the branch slots 3′ and then the entire plate moved endwise along the guide slots 3 until the ends of the offset portions of the plate engage corresponding ends of the slots.

This slight transverse bending of the card is particularly necessary when removing the plate from the card in which case the inner walls of the offset slots 3′ are slightly deflected outwardly, thus permitting the flanges 6 to pass through the branch slots, whereupon the plate may be withdrawn endwise from the guide slots 3 and thus detached from the card 1.

In either method of assembling, however, when the plate is in operative position in the slots 3 its ends engage corresponding ends of the slots to hold said plate and card against accidental detachment, one from the other.

It will also be observed that when the plate is properly positioned on the card, the negative face of its type 5 will be disposed in printing position so that if another card, such as a record card, is placed across the embossed face of the type-plate 4 and the two cards then pressed together, a positive impression of the type 5 will be made upon the record card, these impressions being made by the operation of the platens of the printing machine shown in the pending applications referred to above.

The portions of both faces of the card above and below the type-plate are left blank for the reception of a multiplicity of records such as dates of loan and return of the borrowed article so that the same card may serve the triple purpose of printing, identification of the borrower and receiving the records of dates of loan and return and may be retained by either the librarian or borrower to be used in the printing machine upon the dates of said loan or return for keeping a record of the transactions.

What is claimed is:—

1. A card having spaced slots therein, and a type-plate, said card having means whereby the type-plate may be entered in said slots and slid therein to and from a position interlockingly engaging the slots.

2. A card having spaced slots therein, and a type-plate slidably engageable in and extended across the space between the slots and lying closely adjacent one face of the card and having its opposite edges preformed so as to extend through the corresponding slots and overlap upon the other face of the card when the type-plate is slid into the slots.

3. A flexible card having spaced slots therein, and a type-plate engaged in said slots and slidable therein to and from a position fully engaging the slots, the lengths of the slots being substantially equal to the lengths of the adjacent portions of the type-plate to cause the ends of the slots to engage the adjacent ends of the plate for holding the plate against accidental endwise displacement when adjusted for use.

4. A card having spaced slots therein, and a type-plate operatively extended across the space between the slots and lying closely adjacent one face of the card and having its opposite edges extended through the corresponding slots and overlapping upon the other face of the card, said slots having offset branches at one end of sufficient transverse width to permit said overlapping edges of the type-plate to pass endwise therethrough.

5. A card having spaced slots therein, and a type-plate extended across the space between the slots and lying closely adjacent one side of the card and having its opposite edges extended through the corresponding slots, and provided with return flanges overlapping upon the other face of the card, said slots having branches at one end offset toward each other a distance not less than the transverse widths of the corresponding flanges to allow the latter to pass therethrough.

6. A card having spaced slots therein, and a type-plate embracing the material between the slots and having means thereon engageable in said slots and slidable endwise therein to and from a position fully embraced between the opposite ends of the slots.

7. A card having a pair of spaced slots therein disposed in parallel relation, and a type-plate juxtaposed on one face of the card intermediate the said slots, said type-plate having its opposite marginal edges extending through the corresponding slots and overlapping upon the opposite face of the card so as to provide abutment means at opposite ends of the type-plate disposed in a position normal to the plane of the type-plate and serving to engage the extreme ends of the slots aforesaid to prevent accidental displacement of the type-plate relatively to the card, said slots having branches at one end offset in a direction corresponding to the extension of the overlapped edges of the type-plate whereby to permit endwise movement of the type-plate relatively to the card pursuant to registration of the branch slots with one end of the extended marginal edges of the type-plate.

8. A card having a pair of spaced slots therein disposed in parallel relation, a type-plate juxtaposed on one face of the card intermediate said slots, said type-plate having its opposite marginal edges extending through and slidable in the corresponding slots and overlapping upon the opposite face of the card, said slots having offset branches at one end of sufficient transverse width to permit said overlapping edges of the type-plate to pass endwise therethrough, and said type-plate being provided with type faces on the body thereof intermediate the extended marginal edges, the negative side of said type faces being disposed towards the side of the type-plate opposite to the side of the type-plate which is next to the card.

GAYLORD BROTHERS,
INCORPORATED,
*Assignee of George Van Dusen, Deceased,*
By HENRY J. GAYLORD,
*President.*